INVENTOR.
MELVIN J. COTTERILL
BY Alfred C. Hill
AGENT

July 14, 1964 M. J. COTTERILL 3,141,066

DOUBLE SIDE BAND, SUPPRESSED-CARRIER, PHASE SHIFT TYPE TELEGRAPH SYSTEM

Filed Oct. 4, 1960 2 Sheets-Sheet 2

INVENTOR.
MELVIN J. COTTERILL

BY Alfred C. Hill

AGENT

United States Patent Office 3,141,066

Patented July 14, 1964

3,141,066
DOUBLE SIDE BAND, SUPPRESSED-CARRIER, PHASE SHIFT TYPE TELEGRAPH SYSTEM

Melvin J. Cotterill, Mountain View, Calif., assignor to International Telephone and Telegraph Corporation, Nutley, N.J., a corporation of Maryland Filed Oct. 4, 1960, Ser. No. 60,514
20 Claims. (Cl. 178—66)

Figure 1:
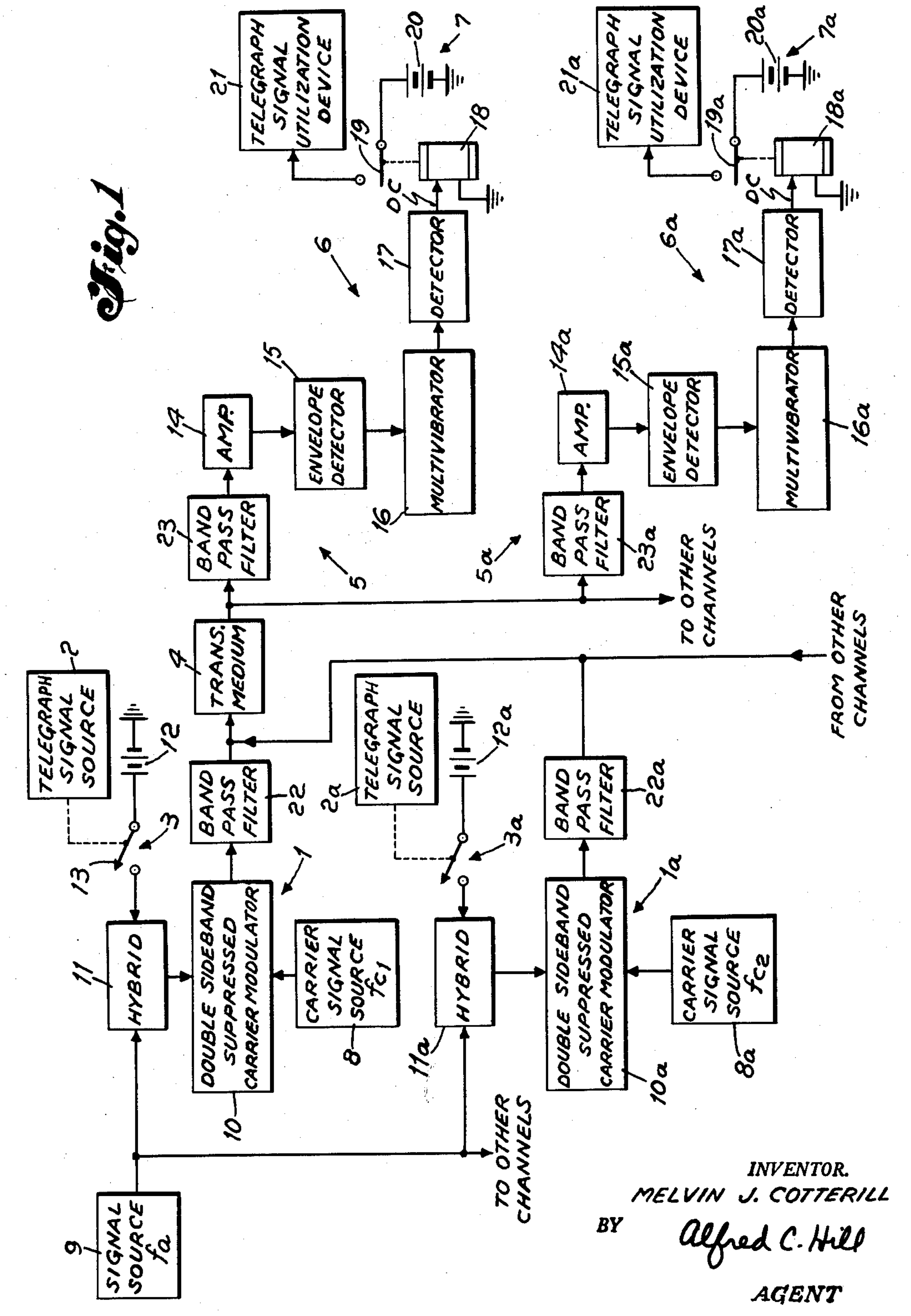

This invention relates to telegraph systems and more particularly to an improved phase shift type telegraph system.

Phase shift type telegraph systems have in the past operated to change the phase of a signal from zero to 180 degrees upon the occurrence of a "mark" to "space" transition from 180 to zero degrees upon the occurrence of a "space" to "mark" transition. Coherent or synchronous detection is required to demodulate the received phase shift telegraph signal. A disadvantage of this system is that an insertion or loss of a phase reversal results in error in the received signal without actual knowledge that this error has occurred since there is no reference condition to indicate whether a "mark" or "space" is being sent.

An object of this invention is to provide an improved phase shift type telegraph system overcoming the above-mentioned disadvantage of previously known phase shift type telegraph systems.

Another object of this invention is to provide an improved phase shift type telegraph system in which the transmitted signal contains an inherent reference condition without increase in bandwidth to indicate whether "mark" or "space" signals are being sent.

A feature of this invention is the provision of a telegraph system comprising means to generate a signal having a given phase characteristic, a source of telegraph signal, and means responsive to the telegraph signal to modify the time of occurrence of the given phase characteristic of the generated signal. The modified signal is transmitted to a remote point where there is provided a means responsive to the given characteristic of the received signal to produce a control signal indicative of the telegraph signal and means responsive to the control signal to reproduce the telegraph signal.

Another feature of this invention is the provision of a phase shift type telegraph system comprising means to generate a double sideband suppressed carrier signal which is modified by a means responsive to a source of telegraph signal to controllably inject direct current voltage into the generator means to control the position of the zero crossover points of the modulation envelope of the suppressed carrier signal. The controlled signal is transmitted to a receiver wherein there is provided a means responsive to the position of the zero crossover points of the received signal to produce a control signal in the form of direct current voltage indicative of the "mark" or "space" condition of the telegraph signal, and means responsive to the control signal to reproduce the telegraph signal.

Other features of this invention include at the transmitter a source of signal having a relatively high, distinctive frequency for each channel of a multiplex system and a source of signal having a relatively low frequency common to all the channels in a multiplex system to produce the double sideband suppressed carrier signal for each channel. At the receiver each of the double sideband suppressed carrier signals are envelope detected. The resultant envelope triggers a multivibrator to produce a square wave signal having an average direct current voltage amplitude which is indicative of the position of the zero crossover points of the modulation envelope of the received signal and, hence, the "mark" or "space" condition of the telegraph signal. The output of the multivibrator is detected to obtain the direct current voltage control signal to reproduce the "mark"-"space" condition of the telegraph signal.

Figure 2:
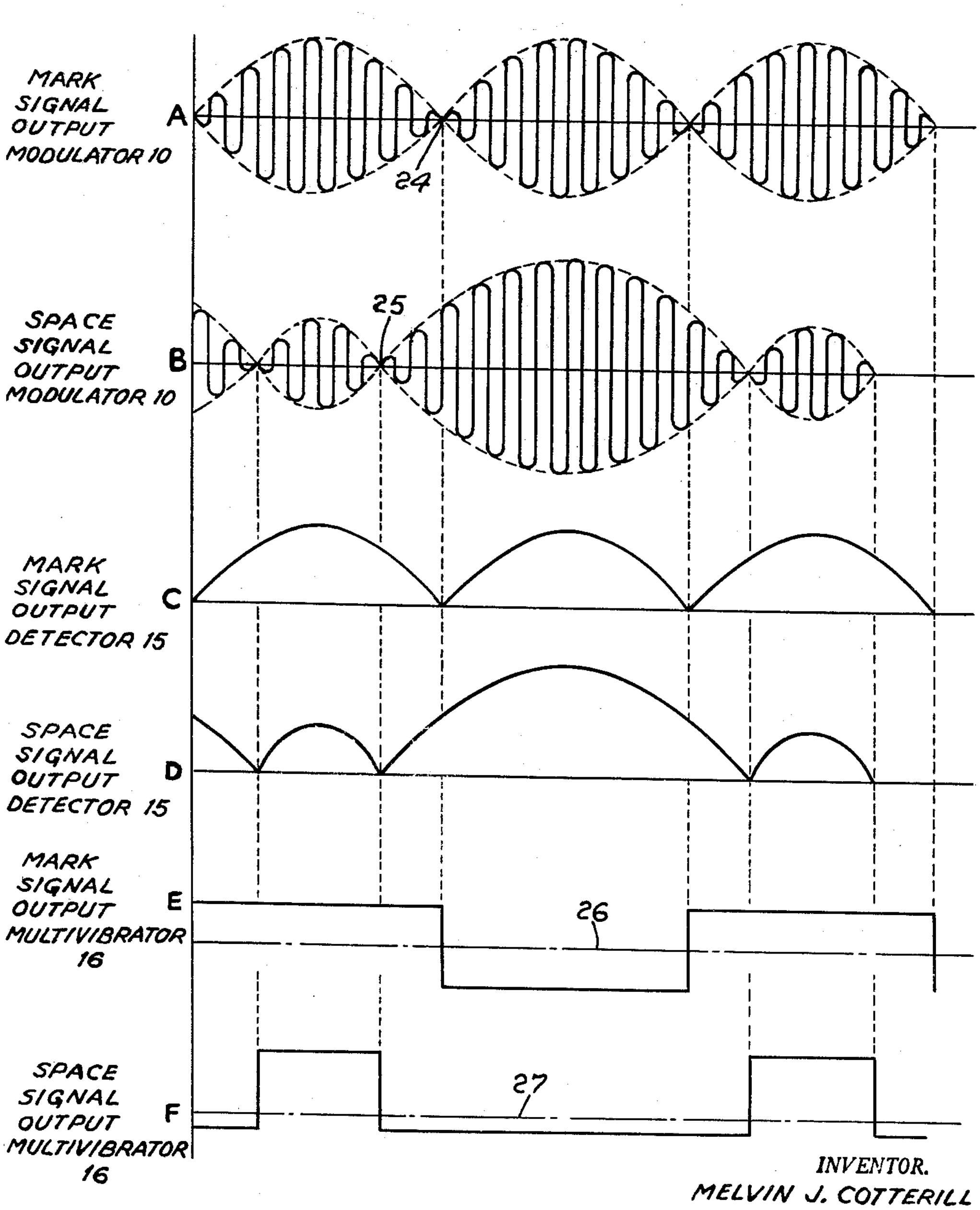

The above-mentioned and other features and objects of this invention will become more apparent by reference to the following description taken in conjunction with the accompanying drawings, in which:

FIG. 1 is a schematic diagram partially in block form of a phase shift type telegraph system following the principles of this invention; and FIG. 2 is a graphical illustration of a series of curves useful in explaining the operation of FIG. 1.

Referring to FIG. 1, there is illustrated therein a phase shift type telegraph system which generically includes a means 1 to generate a signal having a given phase characteristic, a telegraph signal source 2 and a means 3 to modify the time of occurrence of the given phase characteristic of the signal output of means 1. The output of means 1 is propagated by a transmission medium 4, such as a wire cable or radio transmission medium, to a receiver 5 disposed at a remote point from means 1. Receiver 5 includes a means 6 responsive to a given characteristic of the received signal to produce a control signal indicative of the telegraph signal, and a means 7 responsive to the control signal to reproduce the telegraph signal.

More specifically, means 1 includes a signal source 8 having a relatively high frequency which could be considered the carrier frequency of the communication system and a source 9 having a relatively low frequency which could be considered a modulating signal, and a double sideband suppressed carrier modulator 10 coupled to the sources 8 and 9. The signal from source 9 is coupled to modulator 10 through hybrid 11 which permits the application of the signal from means 3 for modification of the output signal of modulator 10. Means 3 is illustrated schematically as incorporating a battery 12 and a switch 13 which is mechanically connected to source 2 to inject through hybrid 11 into modulator 10 a direct current (D.C.) voltage when a "space" signal is sent from source 2 and remove the injected voltage from modulator 10 in the presence of a "mark" signal from source 2. It is of course to be recognized that the "mark"-"space" condition could be reversed provided it was originally understood that the reversal of condition is present. Thus, the output of the modulator 10 is appropriately modified to change the position of the zero crossover points of the modulation envelope of the double sideband suppressed carrier signal to indicate the "mark" and "space" condition of the telegraph signal output of source 2. The output signal of modulator 10 is coupled through medium 4 and, hence, to receiver 5 for operation thereon by means 6. Means 6 includes an amplifier 14 to amplify the output signal of medium 4 and envelope detector 15 to detect the envelope of the output signal of amplifier 14. Means 6 further includes multivibrator 16 activated by the output signal of detector 15 to provide a constant amplitude square wave output having an average D.C. amplitude indicative of the presence or absence of the D.C. voltage of battery 12 and, hence, the "mark" and "space" conditions of the telegraph signals of source 2 and detector 17 which provides a D.C. control signal proportional to the average D.C. level of the square wave output of multivibrator 16. This control signal is coupled to means 7 which includes solenoid 18 responsive to the control signal to control the position of armature 19 in accordance with the telegraph signal of source 2 and, hence, the application of the D.C. voltage from battery 20 to utilization device 21. Thus, the input signal to device 21 is the presence or absence of D.C. voltage which is a reproduction of the telegraph signal of source 2.

FIGURE 1 illustrates a manner in which the telegraph system of this invention may be employed in a multiplex communication system. To provide multiplex communication system, the signal of source 9 is common to each of the telegraph signal channels and the carrier signal from source 8 would be different for each channel with band-pass filters 22 and 23 cooperating to provide distinctive signal channels both at the transmitter and at the receiver where it is necessary to separate the different telegraph signals for application to their appropriate receiving channels.

Turning to FIG. 2, the operation of one telegraph channel will be described with reference to the curves of FIG. 2 to fully explain the operation of the telegraph system of this invention. When a sinusoidal waveform having a frequency $F_c$ from source 8 and a D.C. voltage from battery 12 are injected into modulator 10, for example, a balanced modulator, a lattice modulator or a copper oxide modulator, the resultant output signal is a sinusoidal waveform having a frequency $F_c$ and a level proportional to the amplitude of the D.C. voltage. If an A.C. (alternating current) signal from source 9 having a frequency $F_a$, which is relatively low with respect to the frequency of $F_c$, is injected into modulator 10 along with the signal from source 8, the resultant output signal is a double sideband suppressed carrier signal having frequencies equal to $F_c \pm F_a$. The resultant output waveform is illustrated in Curve A, FIG. 2. Now if the D.C. voltage from battery 12 and the A.C. signal from source 9 are injected simultaneously into modulator 10, the output signal would have the waveform as illustrated in Curve B, FIG. 2. A comparison of the waveforms of Curves A and B illustrates that there has been a shift in the relative position of the modulation envelope zero crossovers from say point 24, Curve A, FIGURE 2 to point 25, Curve B, FIG. 2. The relative position of the envelope zero crossovers is under control of the D.C. voltage that is injected into modulator 10. Thus, telegraph signals of source 2 operate to pulse the D.C. voltage output of battery 12 into modulator 10 at telegraphic speeds resulting in the output signal from modulator 10 being switched from the waveform illustrated in Curve A to the waveform illustrated in Curve B of FIG. 2. These two waveforms then represent the conventional "mark" and "space" signals, respectively, commonly employed in telegraphic signalling systems. Thus, by suitable detection process at the receiving end of the telegraph system it is possible to differentiate between the two signals, the signals of Curves A and B, FIG. 2, and recover the original "mark"-"space" information. Thus, inherently the signals transmitted have a reference condition without necessity of supplying stop-start information per se and, hence, without increase in bandwidth since the signals themselves supply the necessary reference information and it is substantially impossible for these signals to provide a false transition indication to render the information succeeding the false transition in error.

An observation of Curves A and B of FIG. 2 not only indicates the change in position of the zero crossover points from point 24 to point 25 but also that there is a difference in the peak-to-peak amplitude of the waveforms of Curves A and B of FIG. 2. This amplitude change could be detected and used to recover the telegraph information. However, it is preferable to utilize the relative phase shift of the envelope crossovers to recover the telegraph information. A receiver designed to take advantage of this phase shift would have all the improvement associated with phase shift modulation schemes with respect to noise, crosstalk, etc.

Thus, in accordance with the preferred embodiment of this invention, detector 15 detects the envelopes of the signals as indicated in Curves A and B of FIG. 2 resulting in the signals illustrated in Curves C and D of FIG. 2, respectively. These waveforms then operate to activate multivibrator 16 producing, respectively, the signals having the waveforms as indicated in Curves E and F of FIG. 2. It will be observed that the output signals of multivibrator 16 have a constant amplitude but that they have a different average D.C. amplitude. It is this change in D.C. amplitude at the output signal of multivibrator 16 from which detector 17 produces the control signal to activate means 7. As indicated in FIG. 2, the average D.C. level of the signal illustrated in Curve E, FIG. 2 indicative of the transmitted signal of Curve A, FIG. 2, is the dot-dash line 26 having a value which is symmetrically disposed with respect to the square wave of Curve E. The output signal of multivibrator 16 illustrated in Curve F indicative of the transmitted signal of Curve B, FIG. 2, has a D.C. level indicated by dot-dash line 27 which is lower than the D.C. level of the waveform of Curve E. This is due to the change in area in the various portions of the square wave of Curve F. Thus, when D.C. level indicated by line 26 is detected by detector 17 the solenoid 18 is not activated and a D.C. voltage is coupled from battery 20 to utilization device 21 representing a "mark" condition and when detector 17 detects the D.C. level indicated by line 27, battery 20 is disconnected from utilization device 21 representing the "space" condition. Hence, the telegraph signal of source 2 is reproduced in utilization device 21 by the operation of the detector 17 in response to the different D.C. levels present at the output of multivibrator 16 which is in turn under control of the double sideband suppressed carrier signals modified in accordance with the telegraph information transmitted to receiver 5.

While I have described above the principles of my invention in connection with specific apparatus, it is to be clearly understood that this description is made only by way of example and not as a limitation to the scope of my invention as set forth in the objects thereof and in the accompanying claims.

I claim:

1. A telegraph system comprising a single modulator coupled to two sine wave sources to generate a signal having a given phase characteristic, a source of telegraph signal, means coupled to said modulator responsive to said telegraph signal to modify the time of occurrence of said given phase characteristic, means coupled to said modulator to transmit said modified signal to a remote point, means at said remote point responsive to a given characteristic of said transmitted signal to produce a control signal indicative of said telegraph signal, and means responsive to said control signal to reproduce said telegraph signal.

2. A telegraph system comprising a single modulator coupled to two sine wave sources to generate a given signal, a source of telegraph signal, means responsive to said telegraph signal to controllably inject direct current voltage into said modulator to modify said given signal, means coupled to said modulator to transmit said modified signal to a remote point, means at said remote point responsive to a given characteristic of said transmitted signal to produce a control signal indicative of said telegraph signal, and means responsive to said control signal to reproduce said telegraph signal.

3. A telegraph system comprising a single modulator coupled to two sine wave sources to generate a signal having zero crossover points, a source of telegraph signal, means coupled to said modulator responsive to said telegraph signal to control the position of said zero crossover points, means coupled to said modulator to transmit said controlled signal to a remote point, means at said remote point responsive to a given characteristic of said transmitted signal to produce a control signal indicative of said telegraph signal, and means responsive to said control signal to reproduce said telegraph signal.

4. A telegraph system comprising a single modulator coupled to two sine wave sources to generate a signal having zero crossover points, a source of telegraph signal, means coupled to said modulator responsive to said telegraph signal to control the position of said crossover points, means coupled to said modulator to transmit said controlled signal to a remote point, means at said remote point responsive to the position of said zero crossover points of said transmitted signal to produce a control signal indicative of said telegraph signal, and means responsive to said control signal to reproduce said telegraph signal.

5. A telegraph system comprising a single modulator coupled to two sine wave sources to generate a signal having zero crossover points, a source of telegraph signal, means responsive to said telegraph signal to controllably inject direct current voltage into said modulator to control the position of said zero crossover points, means coupled to said modulator to transmit said controlled signal to a remote point, means at said remote point responsive to the position of said zero crossover points of said transmitted signal to produce a control signal indicative of said telegraph signal, and means responsive to said control signal to reproduce said telegraph signal.

6. A telegraph system comprising means to generate a double sideband suppressed carrier signal, a source of telegraph signal, means coupled to said means to generate responsive to said telegraph signal to modify said suppressed carrier signal, means coupled to said generator means to transmit said modified signal to a remote point, means at said remote point responsive to a given characteristic of said transmitted signal to produce a control signal indicative of said telegraph signal, and means responsive to said control signal to reproduce said telegraph signal.

7. A telegraph system comprising means to generate a double sideband suppressed carrier signal, a source of telegraph signal, means responsive to said telegraph signal to controllably inject direct current voltage into said generator means to modify said suppressed carrier signal, means coupled to said generator means to transmit said modified signal to a remote point, means at said remote point responsive to a given characteristic of said transmitted signal to produce a control signal indicative of said telegraph signal, and means responsive to said control signal to reproduce said telegraph signal.

8. A telegraph system comprising means to generate a double sideband suppressed carrier signal having a modulation envelope with zero crossover points, a source of telegraph signal, means coupled to said generator means responsive to said telegraph signal to control the position of the zero crossover points of the modulation envelope of said suppressed carrier signal, means coupled to said generator means to transmit said controlled signal to a remote point, means at said remote point responsive to a given characteristic of said transmitted signal to produce a control signal indicative of said telegraph signal, and means responsive to said control signal to reproduce said telegraph signal.

9. A telegraph system comprising means to generate a double sideband suppressed carrier signal having a modulation envelope with zero crossover points, a source of telegraph signal, means responsive to said telegraph signal to controllably inject direct current voltage into said generator means to control the position of the zero crossover points of the modulation envelope of said suppressed carrier signal, means coupled to said generator means to transmit said controlled signal to a remote point, means at said remote point responsive to the position of said zero crossover points of said transmitted signal to produce a control signal indicative of said telegraph signal, and means responsive to said control signal to reproduce said telegraph signal.

10. A telegraph system comprising a first source of signal having a relatively high frequency, a second source of signal having a relatively low frequency, a double sideband suppressed carrier modulator coupled to said first and second sources to generate a double sideband suppressed carrier signal, a source of telegraph signal, means coupled to said modulator responsive to said telegraph signal to modify said suppressed carrier signal, means coupled to said generator means to transmit said modified signal to a remote point, means at said remote point responsive to a given characteristic of said transmitted signal to produce a control signal indicative of said telegraph signal, and means responsive to said control signal to reproduce said telegraph signal.

11. A telegraph system comprising a first source of signal having a relatively high frequency, a second source of signal having a relatively low frequency, a double sideband suppressed carrier modulator coupled to said first and second sources to generate a double sideband suppressed carrier signal having a modulation envelope with zero crossover points, a source of telegraph signal, means responsive to said telegraph signal to controllably inject direct current voltage into said modulator to control the position of the zero crossover points of the modulation envelope of said suppressed carrier signal, means coupled to said modulator to transmit said controlled signal to a remote point, means at said remote point responsive to the position of said zero crossover points of said transmitted signal to produce a control signal indicative of said telegraph signal, and means responsive to said control signal to reproduce said telegraph signal.

12. A telegraph system comprising means to generate a double sideband suppressed carrier signal having a modulation envelope with zero crossover points, a source of telegraph signal, means coupled to said generator means responsive to said telegraph signal to control the position of the zero crossover points of the modulation envelope of said suppressed carrier signal, means coupled to said generator means to transmit said controlled signal to a remote point, means at said remote point to receive said transmitted signal, means to detect the modulation envelope of said received signal, a multivibrator coupled to said detector means to produce a square wave signal having an average direct current voltage amplitude indicative of the position of the zero crossover points of said received signal, a detector means coupled to said multivibrator to detect said average amplitude, and means responsive to said average amplitude to reproduce said telegraph signal.

13. A telegraph system comprising a first source of signal having a relatively high frequency, a second source of signal having a relatively low frequency, a double sideband suppressed carrier modulator coupled to said first and second sources to generate a double sideband suppressed carrier signal having a modulation envelope with zero crossover points, a source of telegraph signal, means responsive to said telegraph signal to controllably inject direct current voltage into said modulator to control the position of the zero crossover points of the modulation envelope of said suppressed carrier signal, means coupled to said modulator to transmit said controlled signal to a remote point, means disposed at said remote point to receive said transmitted signal, means to detect the envelope of said received signal, a multivibrator responsive to said detected envelope to produce a square wave signal having an average direct current voltage amplitude indicative of the position of the zero crossover points of said received signal, a detector coupled to said multivibrator to detect said average amplitude, and means responsive to said detected average amplitude to reproduce said telegraph signal.

14. A telegraph system comprising a first source of signal having a relatively low frequency, a plurality of transmitting channels, each of said transmitting channels including means coupled to said signal source to generate a double sideband suppressed carrier signal having a modulation envelope with zero crossover points, a source of telegraph signal, and means responsive to said telegraph signal to control the position of the zero crossover points of the modulation envelope of said suppressed carrier signal, means coupled in common to each of said transmitting channels to transmit each of said controlled signals to a remote point, means at said remote point to receive said transmitted signal, and a plurality of receiving channels each including means responsive to a given one of said controlled signals, means responsive to a given characteristic of said given one of said controlled signals to produce a control signal indicative of the associated one of said telegraph signals, and means responsive to said control signal to reproduce the associated one of said telegraph signal.

15. A telegraph transmitter comprising a single modulator coupled to two sine wave sources to generate a signal having a given phase characteristic, a source of telegraph signal, and means coupled to said modulator responsive to said telegraph signal to modify the time of occurrence of said given phase characteristic.

16. A telegraph transmitter comprising means coupled to two sine wave sources to generate a double sideband suppressed carrier signal having a modulation envelope with zero crossover points, a source of telegraph signal, and means responsive to said telegraph signal to controllably inject direct current voltage into said generator means to control the position of said zero crossover points.

17. A telegraph transmitter comprising a first source of signal having a relatively low frequency, a second source of signal having a relatively high frequency, a double sideband suppressed carrier modulator coupled to said first and second sources to generate a double sideband suppressed carrier signal having zero crossover points, a source of telegraph signal, and means responsive to said telegraph signal to controllably inject direct current voltage into said modulator to control the position of said zero crossover points.

18. A telegraph receiver comprising a source of double sideband suppressed carrier signal having the time of occurrence of a given phase characteristic varied in accordance with a telegraph signal, means responsive to a given characteristic of said signal to produce a control signal indicative of said telegraph signal, and means responsive to said control signal to reproduce said telegraph signal.

19. A telegraph receiver comprising a source of double sideband suppressed carrier signal having the position of the zero crossover points thereof controlled in accordance with a telegraph signal, means responsive to the position of said zero crossover points to produce a control signal indicative of said telegraph signal, and means responsive to said control signal to reproduce said telegraph signal.

20. A telegraph receiver comprising a source of signal having a modulation envelope with zero crossover points, the position of the zero crossover points thereof being varied in accordance with a telegraph signal, a means to detect the modulation envelope of said signal, a multivibrator responsive to the detected envelope to produce a square wave signal having an average direct current voltage amplitude indicative of said telegraph signal, a detector coupled to said multivibrator to detect said average amplitude, and means responsive to said detected average amplitude to reproduce said telegraph signal.

References Cited in the file of this patent

UNITED STATES PATENTS

| | | |
|---|---|---|
| 1,886,263 | Ilberg | Nov. 1, 1932 |
| 2,005,084 | Hansell | June 18, 1935 |
| 2,196,381 | Bliss | Apr. 9, 1940 |
| 2,235,859 | Wilson | Mar. 25, 1941 |
| 2,424,971 | Davey | Aug. 5, 1947 |
| 2,480,705 | Brian | Aug. 30, 1949 |
| 2,511,204 | Goldstine | June 13, 1950 |
| 2,819,339 | Scoville | Jan. 7, 1958 |
| 2,910,535 | Terlecki | Oct. 27, 1959 |

FOREIGN PATENTS

| | | |
|---|---|---|
| 828,782 | Great Britain | Feb. 24, 1960 |